United States Patent [19]

Mansfield et al.

[11] 4,117,356
[45] Sep. 26, 1978

[54] ROTOR FOR STEPPING MOTOR

[75] Inventors: Donald Longworth Mansfield, S. Hamilton; Walter Ray Woodward, Carlisle, both of Mass.

[73] Assignee: USM Corporation, Farmington, Conn.

[21] Appl. No.: 759,257

[22] Filed: Jan. 14, 1977

[51] Int. Cl.² ............................................. H02K 37/00
[52] U.S. Cl. .................................... 310/49 R; 310/82; 310/83
[58] Field of Search ....................... 74/640; 310/82, 83, 310/49, 80

[56]  References Cited
U.S. PATENT DOCUMENTS

| | | | |
|---|---|---|---|
| 3,496,395 | 2/1970 | Newell | 310/49 X |
| 3,609,423 | 9/1971 | Spring et al. | 310/83 X |
| 3,894,255 | 7/1975 | Newton, Jr. | 310/49 X |

Primary Examiner—Donovan F. Duggan
Attorney, Agent, or Firm—Carl E. Johnson; Richard B. Megley; Vincent A. White

[57]  ABSTRACT

Speed capability of a rotary stepping motor of the harmonic drive type is markedly increased by providing a stiffer, i.e. harder to radially deflect, structure of its rotor. Elimination of magnetically permeable bridging material as heretofore employed is made possible also in an alternate construction. Basically, thickness of a flexrotor or flexspline wall is made greater than hitherto relative to its outside diameter to provide a stiffness insuring efficient operation at increased natural or resonant frequency. Higher capability of the thicker-stiffer flexspline to maintain its sinusoidal shape during operation results in less tooth wear and increased efficiency over a longer operating life. When concentric ring bridging is incorporated, its total wall-to-outside-diameter ratio thickness is advantageously substantially that of the novel flexrotor or flexspline itself to obtain higher step rates efficiently.

5 Claims, 6 Drawing Figures

ABOUT 0.25% OF O.D.

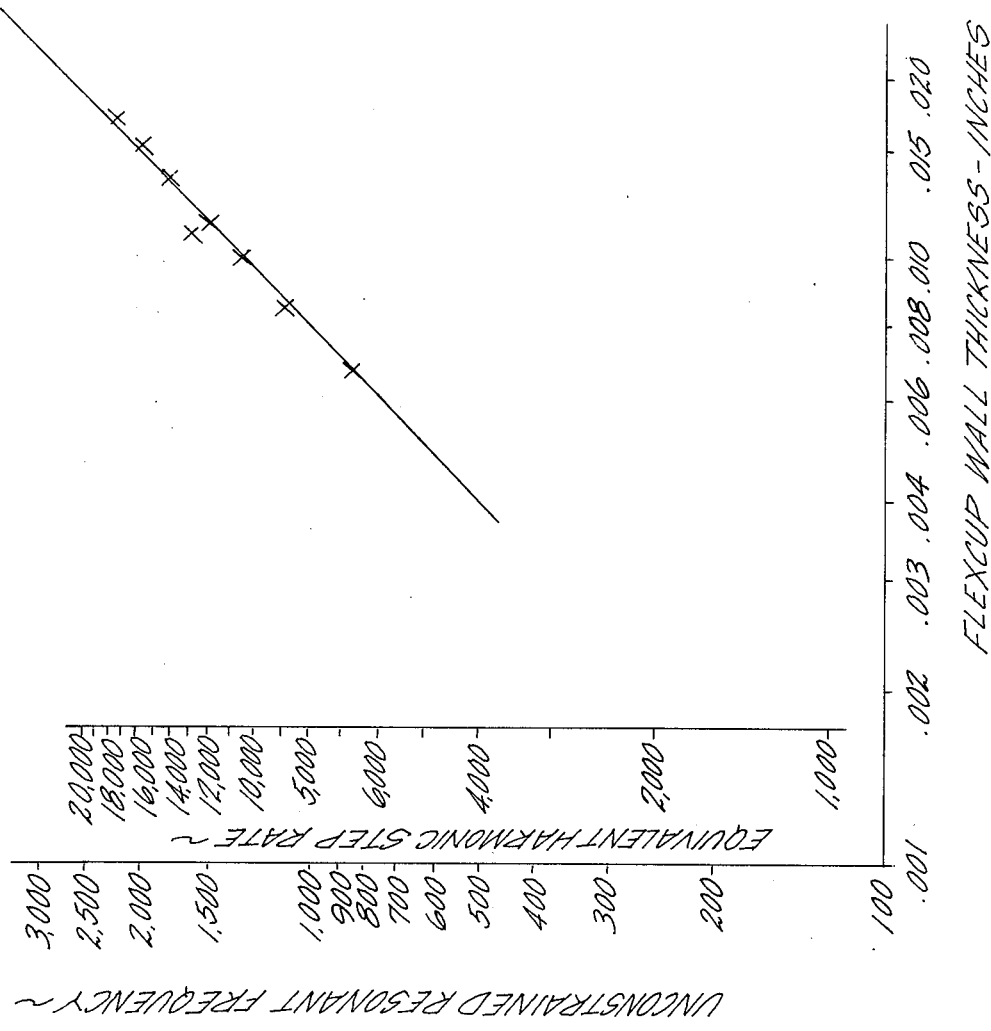

ROTOR FOR STEPPING MOTOR

BACKGROUND OF THE INVENTION

This invention relates to stepping motors of the harmonic drive type. More particularly the invention is concerned with providing an improved flexspline or flexrotor structure for such motors whereby stepping at speeds considerably higher than hitherto attained can be accomplished while retaining an ability to deliver useful torque output at such speed.

Harmonic drive transmission devices, as initially set forth in U.S. Pat. No. 2,906,143 issued Sept. 29, 1959 to Musser, commonly comprise a circular ring gear; a coaxial, radially deflectible gear of slightly different diameter (hereinafter termed a flexspline) having teeth or splines cooperative with those of the ring gear; and a wave generating means (or "strain inducer") for circumferentially propagating a deflection wave in the flexspline. By reason of tooth or spline interengagement at spaced circumferential localities resultant from the flexspline radial deflection and a differential in the numbers of teeth on the gears, their relative rotation is effected.

When the wave generating means employs an electromagnetic field to induce the deflection, for instance as disclosed in U.S. Pat. Nos. 3,169,201 to Spring et al, and 3,331,974 to Proctor, a high-response, low inertia stepping motor is provided. Radial deflection force of the field is converted to reversible, rotary output in small steps of high precision. Driving movement of such stepping motors is directly proportional to the number of pulses in a train appropriately supplied. In addition to exhibiting high acceleration and deceleration rates, motors of this type have proved advantageous in other characteristics such as freedom from backlash, low "overshoot", and short "settling time". One high speed controller arrangement is disclosed, for example, in U.S. Pat. No. 3,402,334 issued to George C. Newton, Jr.; another illustrative driving-circuit having means for modifying a train of pulses to stepping motors of the type above mentioned is described, for instance, in U.S. Pat. No. 3,869,656 to Daniel Kennedy and Walter R. Woodward.

Inertia of a stepping motor of the type being described is low since only the deflected shape of the flexspline element of the actuator is moved (excluding the magnetic field itself). The teeth of the flexspline have been commonly formed on the exterior periphery of the very thin-walled tubes of stainless steel. As set forth, for instance, in the mentioned Proctor pat. 3,331,974 and in U.S. Pat. 3,496,395 to Newell, it has been customary to improve magnetic properties of such flexsplines or flexrotors by incorporating a wound bridging strip or concentric tubes of thin steel. U.S. Pat. No. 3,609,423 to Spring and Woodward further discloses variant forms of such a bridging coil or concentric inner, welded tubes for reducing rotor reluctance, a range of about seven convolutions of magnetic iron each having a thickness of 0.004 inch to 5 convolutions of 0.006 inch thickness each being hitherto deemed an optimum.

It has been continuously appreciated, of course that a flexspline should be machineable, elastic, and capable of fully recovering its shape upon removal of the deforming force. It has also been realized that, in accordance with ring theory, stiffness in a flexspline varies directly as the cube of its thickness, or the sum of the cubes of the thicknesses of the flexspline and turns of its bridging material. Long experience in the design, testing and usage of flexsplines for electromagnetic embodiments of harmonic drives indicated that such inductive metals as 17-4 PH stainless steel would perform satisfactorily and it was thought that utilizing stiffer flexsplines than provided by stock of about a maximum of 0.006 inches would provide excessive resistance to deflection to the extent that a stepping motor would become inoperative or commercially unacceptable because incapable of producing adequate output torque. Higher stepping rates were therefore hitherto generally believed to be unattainable with practical usage, and that any relatively higher rates would be "traded" for unacceptable shorter operating life.

SUMMARY OF THE INVENTION

In view of the foregoing it is an object of this invention to provide an improved rotor for a harmonic drive type stepping motor which shall retain its prior advantageous operating characteristics and be capable of attaining considerably higher stepping speeds coupled with improved output torque and operating life.

A further object is to provide such a motor wherein the rotor, with and without bridging, will be more effective and durable, and its cost not significantly more than in such prior devices.

Another object of the invention is to provide an improved flexrotor or flexspline operable with higher resonant frequency so as to realize a higher speed of rotation of its shape.

To these ends, and as herein shown, the invention contemplates providing in a stepping motor a radially deflectible, cylindrical flexspline or flexrotor of magnetic steel of greater absolute wall thickness and having a new and increased thickness to outside diameter ratio and corresponding increased stiffness, the latter resulting from that ratio being increased to within a range of about 0.50% to about 2.0%.

Another feature of the invention relates to the provision, in a stepping motor, of a tubular flexrotor or flexspline in combination with coaxial ring-type bridging, the latter having a total wall thickness-to outside diameter ratio substantially the same as that ratio exists for the flexrotor or flexspline itself. Differences in the general appearance involved in the rotors of this invention as compared to those of prior art, though seemingly not great, are of considerable importance from a practical standpoint and have considerable commercial significance, for instance, when providing much higher step rates in high speed printing means or controls for these and other stepped devices.

BRIEF DESCRIPTION OF THE DRAWINGS

The foregoing and other features of the invention will now be more particularly described in connection with an illustrative embodiment, and with reference to the accompanying drawings thereof and relevant charts, in which:

FIG. 6 is a graph plotted on a log-log coordinate basis showing how increasing the ratio of rotor wall thickness to O.D. of the flexrotor, i.e. by utilizing increased stiffness resulting from walls thicker than the prior upper limit of about 0.006 inch, permits production of resonant frequency operation with consequent improved, i.e. higher output and stepping rates.

DESCRIPTION OF PREFERRED EMBODIMENT

Figure 1:
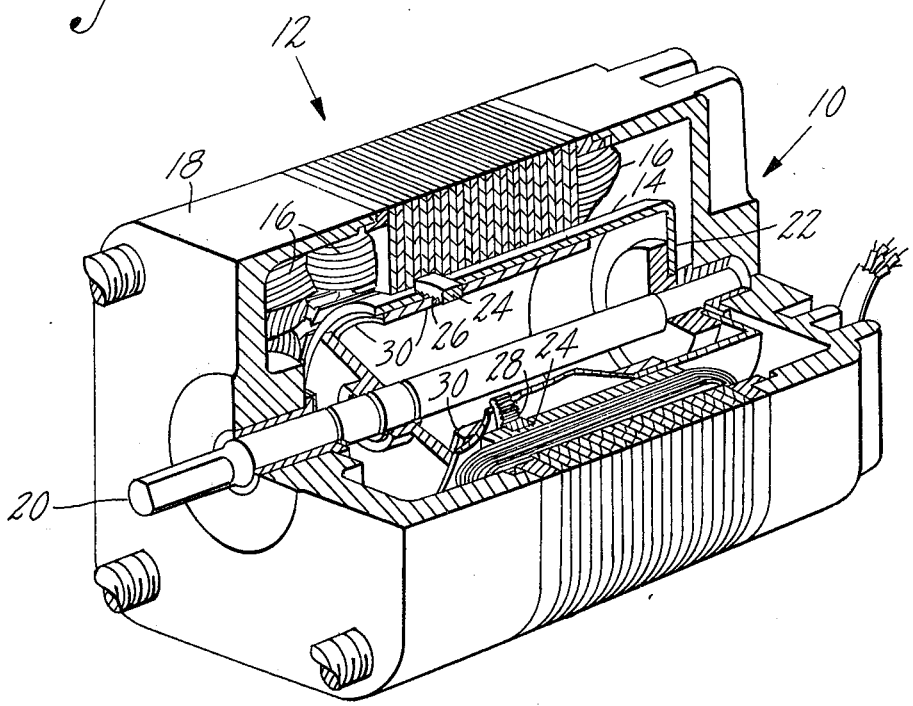
FIG. 1 is a perspective view of a harmonic drive type stepping motor, a quadrant being cut away to reveal internal arrangement, its rotor structure in this instance including both a wall-thickened rotor to provide a novel increased stiffness range as herein explained, and coaxial bridging rings of appropriate complemental stiffness.

Referring first to FIG. 1, a rotor assembly generally designated 10 (FIGS. 1 and 3) is illustrated as mounted in a typical harmonic drive type stepping motor designated 12. The assembly 10 comprises an armature or cup-shaped flexspline 14 which is electromagnetically deflectible radially from its unconstrained cylindrical shape by a control circuit including circumferential, sequentially energizable stator coils 16. A relatively stationary motor housing 18 provides bearing support for a rotatable output shaft 20 coaxial with the flexspline 14. The shaft 20 is usually coupled to an end of the flexspline by means of a mounting diaphragm 22 constituting an end closure, a flexspline of this general configuration sometimes being termed an "flexcup". When employed without spline teeth formed therein, the rotor is herein referred to as a flexrotor. Incidentally, thickness modification of the diaphragm itself within reasonable limits is found to have little or no significant effect on radial stiffness of the flexrotor or flexspline.

Figure 2:
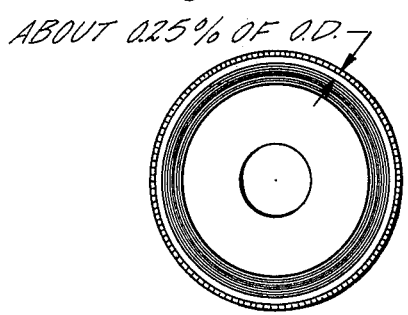
FIG. 2 is a view in end elevation of a prior art or conventional thinner and non-deflected flexspline with prior art bridging material (individual turns not shown) as hitherto employed in motors of the type shown in FIG. 1.
Figure 3:
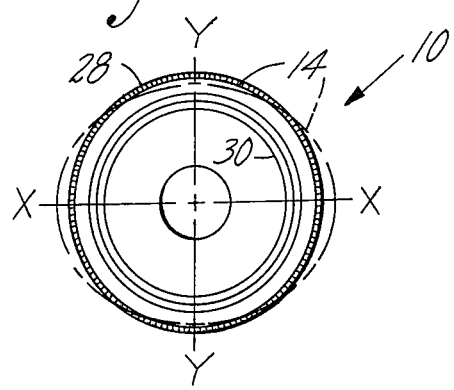
FIG. 3 is a view similar to FIG. 2 but exaggeratedly showing the novel increased wall-thickness flexspline of FIG. 1 and its two bridging tubes, the dash line indicating the exterior of the rotor when electromagnetically deflected to elliptoidal operating shape.

In accordance with previously disclosed practice and as shown, for instance, in FIG. 1 of the mentioned U.S. Pat. 3,331,974, a reaction or rigid circular spline 24 coaxial with the shaft 20 is internally formed with axial spline teeth 26 (FIG. 1) and anchored to the stator for cooperation with external, axial spline teeth 28 (FIGS. 2, 3) formed on the flexspline. In conformity with known harmonic drive operating practice, the flexspline teeth 28 are less in number than the teeth 26 by two (or a multiple thereof) when the flexspline is electromagnetically deflected by the stator to elliptoidal cross section as indicated in FIG. 3. Thus, pulsed input to the stator progressively deflects the flexspline teeth circumferentially, those at the locality of the major axis (X—X) (FIG. 3) being urged outwardly into meshing relation, and those at the minor axis (Y—Y) being deflected radially inward to be out of mesh. It will accordingly be understood that, in this case, it is the elliptoidal shape and axes of the flexspline which are being rotated to impart a much reduced stepping output to the shaft 20. The latter will, of course, be suitably connected to a device to be actuated or controlled.

Hitherto the flexspline wall has been, so far as known, almost invariably of stainless steel and provided with a thickness on the order of 0.005 inch (exaggerated in FIG. 2), it being considered that its stiffness or consequent radial deflectibility then provided a maximum resonant frequency of about 600Hz and an equivalent maximum attainable step rate of about 5,000 Hz, as reflected in FIG. 6. Metals used should, of course, be of high saturation, induction, high permeability, and high fatigue strength.

According to the present invention, and in contrast with the attainable performance of prior art harmonic drive stepping rotors, much increased torque output and notably higher (double and better) step rates can be provided at greater operating efficiency by changing, i.e. increasing, the stiffness or "resistance" to radial deflection of the flexrotor or flexspline assembly 10. This invention yielding a practical and unexpected degree of improvement, deriving from increased wall thickness and hence stiffness, may be defined in different ways. It is believed to be fundamentally and clearly distinguished from known harmonic drive stepping rotor construction by attributing to the flexrotor or flexspline 14 or to the rotor assembly 10 including coaxial bridging 30, a wall thickness to outside diameter ratio selected in the range from about 0.50% to approximately 2.0%. (The comparable ratio in the prior art thinner-walled rotors are smaller.) Thus, as shown in FIG. 5, for instance, the higher output torque attainable with wall thickness 0.007 inch and greater (when no bridging 30 but substantially constant O.D. is maintained) is apparent.

Utilizing thicker walls than hitherto in the flexrotor or flexspline 28 and in the bridging 30 (if incorporated) for attaining the new range of higher stiffness and corresponding higher flexrotor ratios referred to above enables operation of the stepping motor as shown in FIG. 6 with its rotor assembly performing at higher unconstrained resonant frequency and corresponding predictable equivalent stepping rate.

Figure 4:
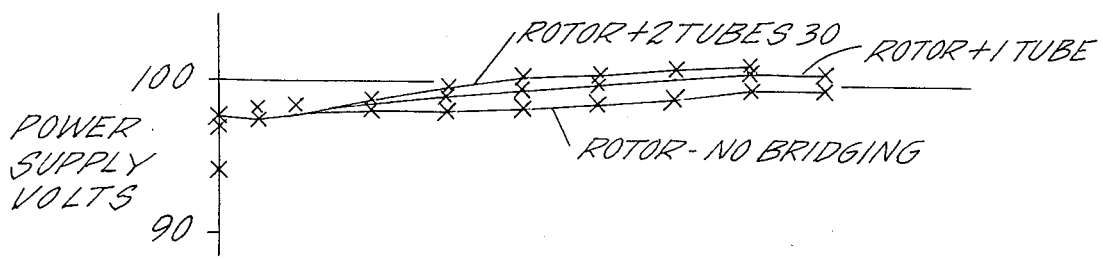
FIG. 4 is a graph illustrating, for a selected flexspline of 0.011 inch thickness and about 1.6 inches O.D. for instance, certain operating data at different step-rates and when driven with (and without) bridging; each tube of which has essentially a wall thickness of 0.011 inch when used.
Figure 4:
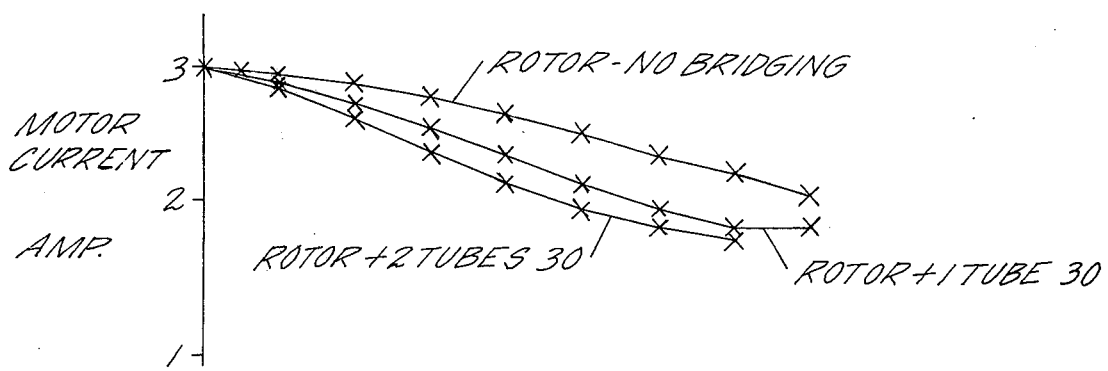
Figure 4:
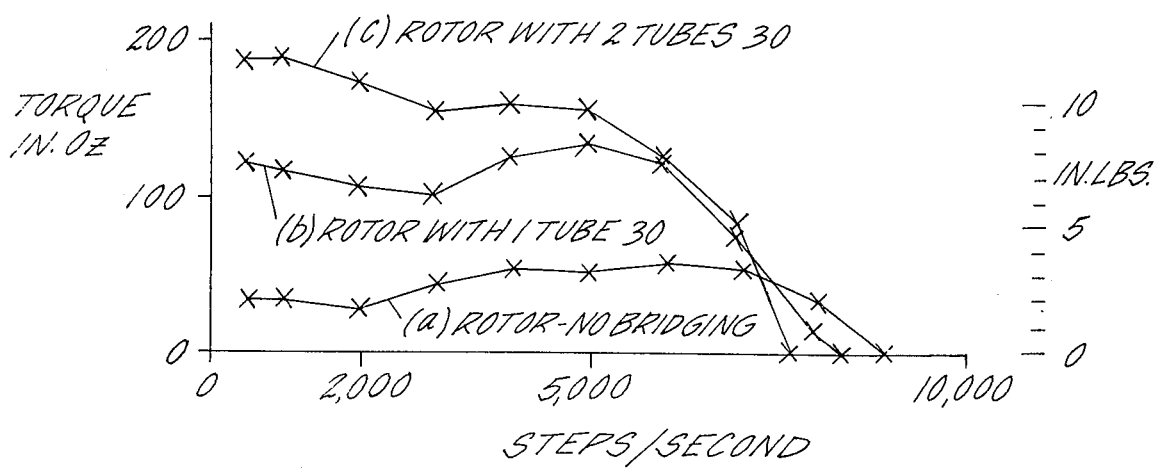

FIG. 4 shows typical performance data for a representative harmonic drive stepping motor wherein the flexspline wall thickness is 0.011 inch, and the ratio of wall flexspline thickness to flexspline O.D. is about 0.65%. The lower section of this three-part chart, wherein step rates are shown to extend up to approximately 9,000 10,000 per sec., indicates for a controlled input, the output torque (a) when the flexspline is used by itself as the rotor, (b) when the flexspline is used with a single bridging tube 30 of 0.011 inch thickness, for a total wall thickness of 0.022 inch, and (c) when the flexspline is used with two-bridging tubes of 0.011 inch thickness each for a total thickness of 0.033 inch. The midportion of FIG. 4 shows corresponding motor current and the upper portion shows the corresponding power supply for the different rotor structure. It will be evident that the bridging 30, up to a degree, aids in developing greater output; more especially it is to be realized that, in keeping with this invention, the total thickness of the bridging (whether one or more coils or tubing 30 is, or are, employed) should approximate that of the flexrotor or flexspline 14 itself to have the same high resonant frequency and hence the same high speed boundary. It may also be noted that for a given total bridging thickness, the thickness of individual bridge laminations or rings should be nearly equal and of the same resonant frequency. The reason for this is that test data indicate that motor resonant life appears to be limited by the thinnest lamination. Also the ratio of mass per unit length for each tube of the rotor assembly is preferably the same.

Figure 5:
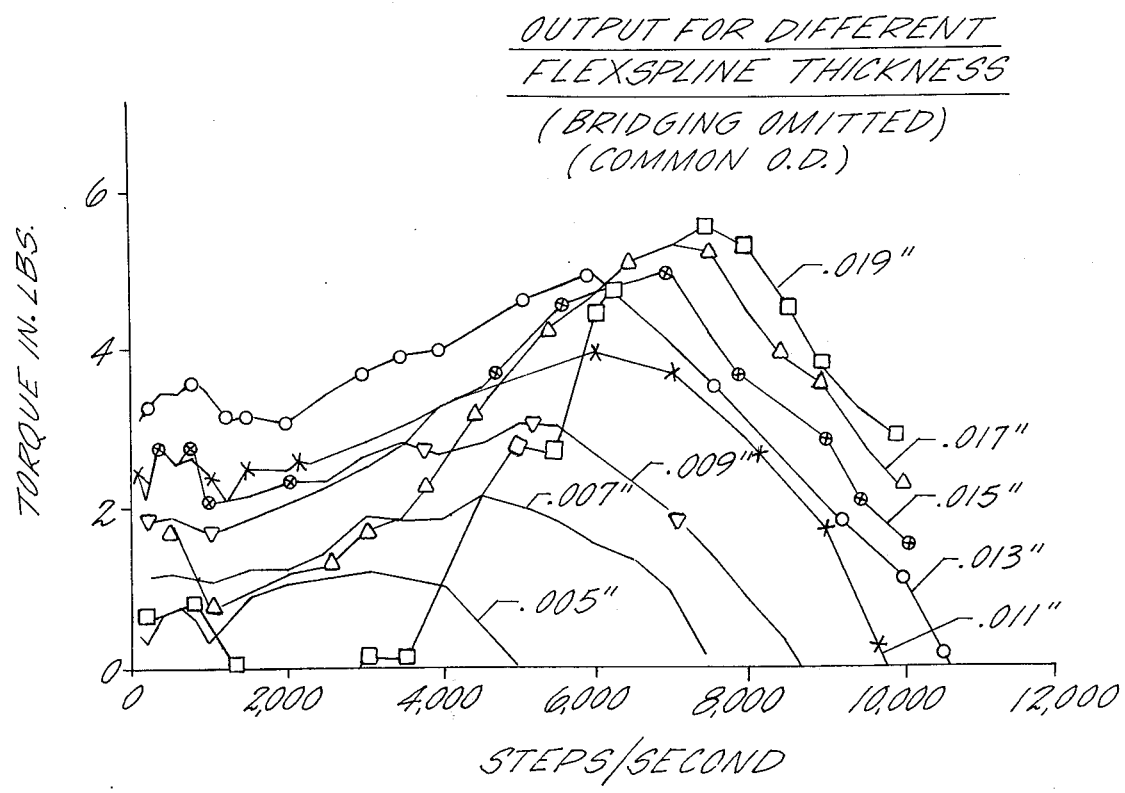
FIG. 5 is a graph showing (from trial data) representative effect on output torque when flexsplines of different wall thickness (including thickness affording the new and higher thickness-to-O.D. ratios) are stepped at increased speed, key marks being for identification and not representing data points.

FIG. 5 shows in log-log coordinate form, the empirical resonant frequencies for different rotor thicknesses indicated, and the corresponding predictable top speeds, respectively, therefor. It will be apparent that rotor stiffness increased, as provided for instance, when the ratio of rotor wall thickness to rotor O.D. comes in the range of about 0.50% to about 2.0%, enables the motor to provide greater output than previously and to attain the higher effeciency of operation at natural frequency. Going above the 2% upper limit requires, by reason of operation of the mentioned variability of ring stiffness with the cube of wall thickness, excessive input of electromagnetic force, regardless of diameter, for the performance attained.

Having thus described our invention, what we claim as new and desire to secure by Letters of the United States is:

1. A stepping motor of the harmonic drive type comprising a substantially cylindrical rotor having a stiffness characterized by a radially deflectable wall the thickness of which has been selected in a ratio to the non-deflected rotor diameter in the range of from about 0.50% to about 2.0%.

2. A motor as in claim 1 wherein the rotor comprises a flexspline and one or more coaxial annular bridging laminations, the wall thickness of each lamination being substantially equal to that of the flexspline.

3. A motor as in claim 1 wherein the rotor stiffness resisting magnetic deflection radially is selected to enable the rotor to step at an optimum rate at its maximum power output and substantially corresponding to a function of its resonant frequency as mounted for cooperation with a rigid circular spline.

4. A harmonic drive type rotor assembly for use in a stepping motor comprising a flexrotor or flexspline the wall thickness of which, in relation to its unconstrained outside diameter, is on the order of from 0.50% to about 2.0%, and coaxial bridging of one or more tubes or convolutions, said tubes or convolutions respectively having a ratio of wall thickness-to-tube or convolution O.D. on the same order substantially.

5. A rotor as in claim 4 comprising a flexspline and coaxial bridging tubes and wherein the ratio of the stiffness to mass per unit length of each tube is substantially the same.

* * * * *